3,393,447
FLUXLESS BRAZING OF ALUMINUM
Roy D. Paul, Windsor, Conn., assignor to United Aircraft Corporation, East Hartford, Conn., a corporation of Delaware
No Drawing. Filed July 6, 1966, Ser. No. 563,068
2 Claims. (Cl. 29—494)

ABSTRACT OF THE DISCLOSURE

A fluxless brazing process for aluminum wherein metallic indium is immersion plated onto a clean, deoxidized aluminum surface to protect it from reoxidation prior to the actual brazing step.

---

This invention relates to a process for brazing aluminum and aluminum alloys and contemplates the formation of a protective coating of indium on the surfaces to be joined after they have been deoxidized to prevent reoxidation thereof prior to the brazing operation.

Articles formed of aluminum and its alloys enjoy wide utility in the aerospace industry because of the good strength to weight ratio of aluminum. In many instances, however, particularly in the production of complex assemblies, it is necessary to join one or more elements together in a brazing operation if maximum utility is to be achieved. It is well known that, upon exposure to air, aluminum rapidly develops a firmly adhering oxide layer on its active surface, the presence of this passive oxide film preventing the formation of a satisfactory brazed bond.

The more common brazing techniques utilize a corrosive flux to remove the oxide film from the surfaces to be joined immediately prior to the brazing cycle, thus providing a clean and active surface to which the brazed material can readily adhere. However, tests have shown that the residues resultant from the use of such fluxes frequently remain entrapped in portions of the assembly and hence are free to continue their corrosive activity in those areas after completion of the fabrication operations. In assemblies of high reliability such a situation cannot be tolerated.

Several improved methods for brazing aluminum alloys at normal bonding pressures without the use of corrosive fluxes have been proposed and used in the industry. Fundamentally these all involve the performance of the brazing cycle in a vacuum or partial vacuum in the presence of an oxide gettering medium which, because of its high affinity for oxygen, preferentially removes the oxide from the aluminum and establishes the desired active surface thereon. One such process is described in the patent to Brace 2,747,066, wherein a readily oxidizable material, such as magnesium, is provided in vapor form in the brazing furnace for benefaction of the atmosphere and deoxidization of the aluminum prior to melting of the braze alloy.

In this and similar processes it may readily be seen that, for the consistent formation of reliable brazed joints, the surfaces to be joined require exposure to the gettering medium for a considerable period of time prior to actual melting and flow of the braze material. Accordingly, both the assemblies to be brazed and the brazing equipment itself must be so designed and fabricated that free access of the gettering vapor is provided to and around each surface to be joined if the requisite deoxidation is to proceed satisfactorily. Moreover, relatively complex vacuum furnaces and associated equipment must usually be used in the process. It has been found in the fabrication in the more complex assemblies that the requisite exposure cannot readily be provided, particularly since the various elements comprising the assembly are usually fixtured to position the surfaces to be joined in intimate contact with one another prior to the establishment of the vacuum.

It is an object of the present invention to provide an improved fluxless brazing process for aluminum and aluminum alloys.

It is a further object of this invention to provide a brazing process for aluminum which has particularly utility in the formation of complex assemblies for use in applications requiring high reliability.

Broadly speaking, this process contemplates the application of a protective layer of metallic indium to each of the surfaces to be joined following cleaning and deoxidation, positioning the components in an assembly with the surfaces in contiguous relationship, and brazing the assembly in a non-oxidizing atmosphere. The indium protects the surfaces prior to and during the initial phase of the brazing cycle, preventing reformation of the passive aluminum oxide thereon while in and of itself causing no detrimental change in the characteristics of either the brazed alloy or the substrate material.

The use of metallic indium is of fundamental importance in the process. It melts at a low enough temperature (155° C.) to permit the use of the low melting point braze alloys where desired, and exhibits only limited solubility in the aluminum base metal. Furthermore, any alloying reaction which does take place with the aluminum will impart increased corrosion resistance thereto with no observable detrimental effect on the other properties of the material. In addition, in some instances, depending on the particular materials used in the process, it may in fact contribute a substantial strengthening effect to the brazed joint. For example, indium has been found to react with the manganese present in some aluminum alloys to form an intermetallic which provides increased strength to the material through a dispersion strengthening mechanism.

Various heat exchanger assemblies have been satisfactorily fabricated in accordance with the teaching herein. In one form of the heat exchangers, the plates and fins were formed of AMS4025 and AMS4006 aluminum alloys respectively. The nominal composition of the AMS4025 alloy was, by weight, 1% magnesium, 0.6% silicon, 0.25% copper, 0.25% chromium, balance aluminum. The AMS4006 composition was, by weight, 1,25% manganese, balance aluminum.

Several different braze alloys were used in conjunction with the above-mentioned materials, including the Alcoa alloys Nos. 713 and 718, with the 718 alloy yielding the superior product. The compositions of these alloys were as follows, the single figures indicating maximum amounts:

Alcoa #713—6.8–8.2 silicon, 0.25 copper, 0.8 iron, 0.2 zinc, balance aluminum

Alcoa #718—11–13 silicon, 0.3 copper, 0.8 iron, 0.2 zinc, 0.1 magnesium, 0.15 manganese, balance aluminum The details comprising the assembly were first degreased and alkaline electrocleaned utilizing an aqueous bath consisting of 6–14 oz./gal. sodium hydroxide and 4–12 oz./gal. sodium cyanide, with stain inhibitors present in small quantities. A commercially available alkaline cleaning bath known as Metex T–170 is suitable for this purpose. Cleaning was effected with the bath held at a temperature of 130–180° F. using a current density of 25 amps/square foot.

Following a water rinse, the parts were desmutted in nitric acid (50% by volume) and deoxidized in a nitric-hydrofluoric acid solution (35% nitric acid, 3.5% hydrofluoric acid, 61.5% water). The parts were then transferred while wet to the plating bath wherein the indium protective coating was applied.

Plating was effected at 1.5 volts for a period of 10 minutes in an aqueous bath consisting of 23.5 cc./gallon indium sulfate, 37.9 cc./gallon sodium sulfate, 2 grams/gallon potassium persulfate, 1 cc./gallon hydrofluoric acid, the bath being held at 120° F. at pH 2.5. The resulting plating thickness was 0.0002 inch.

The thickness of the indium coating is relatively immaterial as long as it is sufficient to provide the desired oxide barrier for the length of the storage period anticipated. A plating buildup over the required minimum is not detrimental to the process, but will normally be avoided for the sake of economy.

It is, of course, not essential that the indium be applied to the surfaces to be joined by electroplating techniques and, accordingly, other means of providing the protective layer of indium are contemplated.

In an alternative indium coating procedure, chemical displacement coating or immersion plating techniques were utilized, immersion plating having reference to the deposition without current of a metal from an ionic solution onto a solid of a less noble metal than that provided in ionic form. The most common example of this system is the deposition of pure copper on iron or steel when immersed in a copper sulfate solution.

Parts coated with indium by the immersion plating method were first cleaned and deoxidized as previously described. They were then immersed for periods of from 5 minutes to 2 hours, depending upon the thickness of the coating desired, in a 0.823 normal nitric acid solution containing 0.03 gram/milliliter of metallic indium and 1 milliliter of hydrofluoric acid per liter of solution. Parts coated by this method were revealed to produce satisfactory solder and braze joints in subsequent tests.

The braze alloy was usually provided in the form of thin foil which was held in position between the surfaces to be joined. It was found preferable to protect the surface of the foil with indium plate for the same reasons the aluminum substrate is protected, i.e., to prevent the formation of the passive oxide film thereon.

After cleaning and plating, the plates, fins and braze alloy sections were fixtured into an assembly and brazed at a temperature between the melting point of the braze alloy and that of the substrate for a period of six minutes in a non-oxidizing atmosphere. In several assemblies, utilizing the materials previously described, brazing was effected in a vacuum ($1-2 \times 10^{-3}$ mm. Hg) at 1150° F.

Vacuum brazing is not a requirement of the process, however. Satisfactory brazes are alternatively made in either a hydrogen or inert atmosphere. While oxidation of the indium plate is not a problem, any indium oxide which is formed is readily reduced with hydrogen at the normal brazing temperatures of about 1000° F. utilized in the process.

While the instant method in its preferred embodiment as hereinbefore described contemplates the use of brazing foil plated with indium and held between indium plated substrate surfaces in the fixtured assembly, it is possible to apply the braze material directly to the clean surface of the substrate on some or each of the several details and provide a single layer of indium thereover with similarly satisfactory results.

Furthermore, indium has been found to readily bond to itself under slight pressure. Accordingly, the plated braze alloy may be provided in the powder form and pressed into position on the surfaces to be joined prior to assembly in the brazing furnace. Because of the self-bonding capability of indium, the braze material will readily maintain its shape until the melting temperature is reached and flow commences.

As used throughout, the terms aluminum and aluminum alloys have been used interchangeably, and such usage is intended. Accordingly, when reference is made to aluminum, the term is intended to include the aluminum base alloys and vice versa.

It will be seen that by means of the invention described a greatly improved process for fluxless brazing of aluminum has been provided. While the invention has been taught in connection with several preferred embodiments and examples, other modifications thereto will be evident to those skilled in the art and, accordingly, no limitation is intended thereby except as set forth in the appended claims.

The embodiments of the invention in which an exclusive property or privilege is claimed are defined as follows:

1. A fluxless brazing process for joining aluminum alloy articles comprising the steps of:
   cleaning and deoxidizing each aluminum surface to be joined,
   plating the clean deoxidized surfaces with metallic indium by chemical displacement techniques in a both consisting essentially of nitric acid, hydrofluoric acid and metallic indium, to a thickness of at least 0.0002 inch, and
   brazing the surfaces together with an aluminum-silicon braze alloy consisting predominantly of aluminum, in a non-oxidizing atmosphere.

2. A fluxless brazing process for joining aluminum alloy articles which comprises the steps of:
   cleaning and deoxidizing each aluminum surface to be joined,
   immersion plating the clean deoxidized surfaces with metallic indium to a thickness of at least 0.0002 inch,
   and brazing the surfaces together with an aluminum-silicon brazing alloy consisting predominantly of aluminum, in the absence of oxygen.

References Cited

UNITED STATES PATENTS

| | | | |
|---|---|---|---|
| 2,192,751 | 3/1940 | Melchior | 29—504 X |
| 2,464,821 | 3/1949 | Ludwick | 29—502 X |
| 2,746,140 | 5/1956 | Belser | 29—504 X |
| 2,824,365 | 2/1958 | Erickson | 29—504 X |
| 3,153,716 | 10/1964 | Schroeder | 29—492 X |
| 3,321,828 | 5/1967 | Miller | 29—501 X |
| 3,322,517 | 5/1967 | Miller | 29—197.5 |
| 2,438,967 | 4/1948 | Ellsworth | 29—504 X |
| 2,623,273 | 12/1952 | Murray | 29—504 X |
| 3,087,813 | 4/1963 | Veno | 29—504 X |
| 3,141,238 | 7/1964 | Harman | 29—498 |

OTHER REFERENCES

A Technique of Soldering to Thin Metal Films, Richard B. Belser, the Review of Scientific Instruments, vol. 25, No. 2, February 1954, pp. 180–183.

JOHN F. CAMPBELL, *Primary Examiner.*

CHARLIE T. MOON, *Examiner.*

R. F. DROPKIN, *Assistant Examiner.*